(12) United States Patent
Jang et al.

(10) Patent No.: US 11,496,224 B2
(45) Date of Patent: Nov. 8, 2022

(54) COMMUNICATION DEVICE FOR ADJUSTING COMMUNICATION CHANNEL DEPENDING ON OPTICAL COMMUNICATION ENVIRONMENT AND COMMUNICATION METHOD USING THE SAME

(71) Applicant: Kookmin University Industry Academy Cooperation Foundation, Seoul (KR)

(72) Inventors: Yeong Min Jang, Seoul (KR); Ngoc Huy Nguyen, Seoul (KR)

(73) Assignee: Kookmin University Industry Academy Cooperation Foundation, Seoul (KR)

(*) Notice: Subject to any disclaimer, the term of this patent is extended or adjusted under 35 U.S.C. 154(b) by 0 days.

(21) Appl. No.: 17/361,879

(22) Filed: Jun. 29, 2021

(65) Prior Publication Data
US 2022/0166521 A1   May 26, 2022

(30) Foreign Application Priority Data

Nov. 25, 2020  (KR) .................. 10-2020-0160528
Dec. 2, 2020   (KR) .................. 10-2020-0166573

(51) Int. Cl.
| | | |
|---|---|---|
| H04B 10/11 | (2013.01) | |
| H04B 10/69 | (2013.01) | |
| H04L 5/00 | (2006.01) | |
| H04B 10/116 | (2013.01) | |
| H04B 10/516 | (2013.01) | |

(52) U.S. Cl.
CPC ....... *H04B 10/6932* (2013.01); *H04B 10/116* (2013.01); *H04B 10/6911* (2013.01); *H04L 5/0007* (2013.01); *H04B 10/11* (2013.01); *H04B 10/516* (2013.01)

(58) Field of Classification Search
CPC .............. H04B 10/6932; H04B 10/116; H04B 10/6911; H04B 10/11; H04B 10/516; H04L 5/0007; H04L 27/2626; H04L 27/0008; H04L 27/18
USPC ................................. 398/118–131, 182–201
See application file for complete search history.

(56) References Cited

U.S. PATENT DOCUMENTS

| | | | |
|---|---|---|---|
| 7,961,798 B2 * | 6/2011 | Jun ..................... | H04L 27/2608 375/312 |
| 9,621,268 B2 * | 4/2017 | Elgala ................. | H04B 10/116 |
| 10,560,193 B2 * | 2/2020 | Jang ..................... | H04B 10/556 |
| 11,044,017 B2 * | 6/2021 | Jang ..................... | H04B 10/116 |

(Continued)

FOREIGN PATENT DOCUMENTS

| | | |
|---|---|---|
| KR | 101472583 B1 | 12/2014 |
| KR | 20190122852 A | 10/2019 |

OTHER PUBLICATIONS

Jang et al, WO2018169179A1, Sep. 2018, All Document. (Year: 2018).*

(Continued)

*Primary Examiner* — Dibson J Sanchez
(74) *Attorney, Agent, or Firm* — Haynes and Boone, LLP

(57) ABSTRACT

A communication device effectively transmits high-speed data while being less affected by restrictions of an environment by adjusting a communication channel depending on an optical communication environment.

16 Claims, 9 Drawing Sheets

(56) References Cited

U.S. PATENT DOCUMENTS

| | | | | |
|---|---|---|---|---|
| 2009/0208221 A1* | 8/2009 | Sasai | .................. | H04B 10/116 |
| | | | | 398/118 |
| 2012/0257898 A1* | 10/2012 | Yokoi | ................ | H04L 27/2697 |
| | | | | 398/76 |
| 2013/0251374 A1* | 9/2013 | Chen | ................. | H04B 10/1141 |
| | | | | 398/118 |
| 2017/0201321 A1* | 7/2017 | Uysal | .................. | H04B 10/116 |
| 2020/0252131 A1* | 8/2020 | Jang | ................... | H04B 10/676 |

OTHER PUBLICATIONS

Nguyen et al, Region of Interest Signaling Vehicular System Using Optical Camera Communications, Feb. 2017, All Document. (Year: 2017).*

Thieu et al., New Waveforms for Selective RoI Signaling High rate Optical Camera Communication System, Aug. 2018, All Document. (Year: 2018).*

Moh. Khalid Hasan et al., Fuzzy Based Network Assignment and Link-Switching Analysis in Hybrid OCC/LiFi System, Hindawi, Wireless Communications and Mobile Computing, vol. 2018, Article ID 2870518, 16 pages, Published Nov. 19, 2018.

Palvanov Akmaljon Alijon O'G'Li et al., DHCNN for Visbility Estimation in Foggy Weather Conditions, IEEE Xplore, DOI 10.1109/SCIS-ISIS.2018.00050, pp. 240-243, downloaded on Jan. 28, 2021.

Trang Nguyen, et al, Current Status and Performance Analysis of Optical Camera Communication Technologies tor 5G Networks, IEEE Access, vol. 5, 2017. pp. 4574-4594.

Trang Nguyen et al., 2D-OFDM for Optical Camera Communication: Principle and Implementation, IEEE Access, Feb. 18, 2019, vol. 7, pp. 29405-29424.

Van Hoa Nguyen et al., Design and Implementation of the MIMO-COOK Scheme Using an Image Sensor for Long-Range Communication, Apr. 16, 2020, Sensors 2020, 20, 2258, doi:10.3390/s20082258, 16 pages.

* cited by examiner

700

COMMUNICATION DEVICE FOR ADJUSTING COMMUNICATION CHANNEL DEPENDING ON OPTICAL COMMUNICATION ENVIRONMENT AND COMMUNICATION METHOD USING THE SAME

CROSS-REFERENCE TO RELATED APPLICATIONS

This application claims priority from Korean Patent Applications No. 10-2020-0160528, filed on Nov. 25, 2020, and Korean Patent Applications No. 10-2020-0166573, filed on Dec. 2, 2020, in the Korean Intellectual Property Office, the disclosures of which are incorporated herein by reference in their entirety.

BACKGROUND OF THE INVENTION

Field of the Invention

The present invention relates to a communication device for adjusting a communication channel depending on an optical communication environment and a communication method using the same, and more particularly to a communication device for adjusting a communication channel depending on an optical communication environment and a communication method using the same for effectively transmitting data at high speed by adjusting a communication channel depending on an optical communication environment.

Description of the Related Art

The content described below is only described for the purpose of providing background information related to embodiments of the present invention, and the described content does not naturally constitute the prior art.

Recently, research has been actively conducted into visible light communication (VLC) technology that is wireless communication technology created by adding a communication function to a visible light wavelength using infrastructure configured by substituting a lighting device such as an incandescent lamp and a fluorescent lamp with a semiconductor light emitting diode (LED) lighting.

Four light sources are installed at front and rear sides of a vehicle, and in this regard, research has been conducted into a method of transmitting and receiving data using two light sources. With the development of image processing technology, a method of transmitting and receiving data using a light source has been developed as useful technology for vehicle to vehicle communication. In this regard, Korean Patent Publication No. 10-1472583 discloses a camera communication system for extracting data corresponding to a frame acquired by capturing a light source that is turned on and off.

In general, among methods of receiving data using a light source, a method of transmitting and receiving data at low speed includes a method of receiving data based on OCC, and in conventional VLC technology, high speed data reception is mainly performed via a method of transmitting and receiving data based on LiFi using a photodetector (a photodiode (PD)). Thereamong, there is a problem in that a data reception method based on LiFi of a high speed data reception method has a short communication distance and is vulnerable to change in lighting environment.

Accordingly, in accordance with the current trends, there has been a need for technology for transmitting and receiving data at high speed without restrictions of environmental change in VLC between communication subjects such as vehicle to vehicle communication (e.g., vehicle to vehicle (V2V)).

The above-described prior art is technical information that the inventor possesses for derivation of the present invention or acquires during the derivation process of the present invention, and is not necessarily known technology disclosed to the general public prior to filing of the present invention.

SUMMARY OF THE INVENTION

Therefore, the present invention has been made in view of the above problems, and it is an object of the present invention to minimize an environmental restriction and to transmit and receive data at low speed by adjusting a high-speed data communication channel based on an environment in visible light communication (VLC).

It is another object of the present invention to determine an optical communication environment based on a change in a weather environment and to transmit and receive data at high speed by adjusting a high-speed data communication channel based on the determined optical communication environment.

It is a further object of the present invention to provide a method of transmitting and receiving data at high speed, which is robust to weather change and influence of a lighting environment while having high reliability through VLC technology.

The object of the present invention is not limited to the problems mentioned above, and other objects and advantages of the present invention that are not mentioned may be understood by the following description, and will be more clearly understood by the embodiments of the present invention. In addition, it will be appreciated that the objects and advantages of the present invention may be realized by elements of the claims and combinations thereof.

In accordance with an aspect of the present invention, the above and other objects may be accomplished by the provision of a communication method of adjusting a communication channel depending on an optical communication environment, the method including determining the optical communication environment based on an image acquired from a camera for capturing an outside for optical communication, generating a first pulse signal and a second pulse signal by modulating first type information into a pulse wave signal using a S2-PSK method, and then modulating second type information into any one of a first OFDM signal in a first frequency band and a second OFDM signal in a second frequency band based on the optical communication environment.

In this case, the second frequency band may be wider than the first frequency band, the second frequency band may be higher than the first frequency band, and when the optical communication environment is an environment in which it is impossible to perform optical communication through a photodiode, a final transmission signal may be generated by synthesizing the first pulse signal and the second pulse signal with the first OFDM signal.

The second frequency band may be wider than the first frequency band, the second frequency band is higher than the first frequency band, when the optical communication environment is an environment in which it is possible to perform optical communication through a photodiode, the modulating may include modulating the second type information into the second OFDM signal in the second frequency band, and a final transmission signal may be generated by synthesizing the first pulse signal and the second pulse signal with a second OFDM signal.

The communication device may be installed in a vehicle, the first type information may be data having a size less than a first size and include an identification number of the vehicle or position information of the vehicle, and the second type information may be data having a size equal to or greater than a second size and includes information related to driving of the vehicle or information related to safety of the vehicle.

The optical communication environment may include a weather condition and a distance between the vehicle and another vehicle as an optical communication target.

In accordance with another aspect of the present invention, there is provided a communication device for adjusting a communication channel depending on an optical communication environment, the device including a camera configured to capture an outside for optical communication, a transmission signal generator configured to generate a signal for transmission, a signal transmitter configured to transmit the generated signal through a light source connected to the communication device, and a controller configured to determine an optical communication environment based on an image acquired from the camera and to control the transmission signal generator and the signal transmitter.

In this case, the transmission signal generator may generate a first pulse signal and a second pulse signal by modulating first type information into a pulse wave signal using a S2-PSK method and may modulate second type information into any one of a first OFDM signal in a first frequency band and a second OFDM signal in a second frequency band based on the optical communication environment.

The communication device for adjusting a communication channel depending on an optical communication environment may include at least one controller, and a memory operatively connected to the controller and configured to store at least one code executed by the controller.

Here, the memory may store a code for causing the controller to determine the optical communication environment based on an image acquired from a camera for capturing an outside for optical communication, to generate a first pulse signal and a second pulse signal by modulating first type information into a pulse wave signal using an S2-PSK method, and to modulate second type information into any one of a first OFDM signal in a first frequency band or a second OFDM signal in a second frequency band based on the optical communication environment when the code is executed through the controller.

In accordance with another aspect of the present invention, there is provided a communication control method of adjusting a communication channel depending on an optical communication environment, the method including receiving an image including an optical signal using a camera of a first frame rate, determining an optical communication environment based on the image, and then activating one of a camera of a second frame rate and a photodetector based on the determined optical communication environment.

The communication control method may further include extracting first type information based on an optical signal after receiving the image.

Here, when the camera of the second frame rate is activated, second type information may be extracted based on an image received by a camera of a second frame rate. In contrast, when the photodetector is activated, the second type information may be extracted by an optical signal received by the photodetector.

In this case, the camera of the first frame rate has a lower speed than the second frame rate. In particular, the first type information has a size less than a first size and may include any one of an identification number of the vehicle or position information of the vehicle. In addition, the second type information has a second size greater than the first size, and may be any one of information related to driving of the vehicle and information related to safety of the vehicle.

In more detail, after the image is received, the optical signal received by the camera of the first frame rate may be demodulated using an S2-PSK method, and when the camera of the second frame rate is activated, the optical signal from the image received from the camera of the second frame rate may be demodulated using an OFDM signal demodulation method of the first frequency band.

After the image is received, when the optical signal received by the camera of the first frame rate is demodulated using an S2-PSK method and then the photodetector is activated, the optical signal received by the photodetector may be demodulated using an OFDM signal in a second frequency band.

When the image is received and then the camera of the second frame rate is activated, a shutter speed and a focal length of the camera of the second frame rate may be changed based on the determined optical communication environment. When the optical communication environment is poor, high-speed data may be more accurately received by changing settings of the camera of the second frame rate.

Similarly, when the image is received and then the photodetector is activated, a focal length and a signal sampling rate of the photodetector may also be changed based on the determined optical communication environment.

In accordance with another aspect of the present invention, there is provided a communication device for adjusting a communication channel depending on an optical communication environment, the device including a first camera configured to receive a first image as a camera of a first frame rate, a second camera configured to receive a second image as a camera of a second frame rate, a photodetector configured to an optical signal, and a processor configured to process signals received from the first camera, the second camera, and the photodetector.

In this case, the communication device may be configured to determine a communication environment based on a first image by the processor and to activate one of the second camera and the photodetector based on the determined optical communication environment.

Other aspects, features, and advantages other than those described above will become apparent from the following drawings, claims, and detailed description of the invention.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
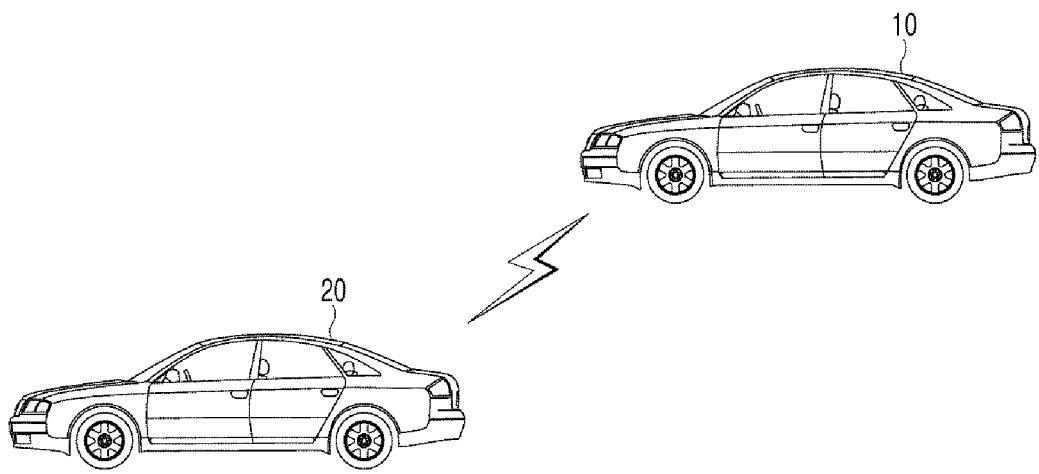
FIG. 1 is a schematic diagram showing vehicles and vehicle to vehicle communication (V2V) according to an embodiment of the present invention.

Exemplary embodiments of the present invention are described in detail with reference to the accompanying drawings. However, the present invention may be implemented in various different forms, and is not limited to these embodiments. To clearly describe the present invention, parts that are not directly related to the description are omitted, but when a device or system to which the spirit of the present invention is applied is implemented, this may not mean that the omitted configuration is unnecessary. In addition, the same reference numerals are used for the same or similar elements throughout the specification.

In the following description, terms such as first and second may be used to describe various components, but the components should not be limited by the terms, and the terms are used only for distinguishing one component from another component. In addition, in the following description, expressions in the singular include plural expressions unless the context clearly indicates otherwise.

In the following description, terms such as "include" or "comprise" may be construed to denote a certain characteristic, number, step, operation, constituent element, part, or combination thereof, but may not be construed to exclude the existence of or possibility of addition of one or more other characteristics, numbers, steps, operations, constituent elements, parts, or combinations thereof.

Hereinafter, the present invention is described in detail with reference to the accompanying drawings.

In the following description and drawings, it is described that the embodiments of the present invention are implemented in a vehicle, but it is natural that the technologies of the present invention may be widely used in devices for performing optical signal communication other than a vehicle.

FIG. 1 is a schematic diagram showing vehicles and vehicle to vehicle communication (V2V) according to an embodiment of the present invention.

Referring to FIG. 1, each of vehicles 10 and 20 may include a communication device for transmission and reception for V2V. In detail, the communication device may include a device for transmitting and receiving information on a vehicle (e.g., a vehicle identification number, vehicle position information, vehicle driving information, vehicle safety information, or image or voice information) using at least two of headlights and backlights of each of different vehicles.

A signal containing the information on the vehicle transmitted and received by such reception and transmission devices may have a hybrid waveform and may be formed by mixing a pulse wave signal, configured using an S2-PSK method, with an OFDM waveform using OCC technology. In detail, when the signal is transmitted and received in the hybrid waveform according to an embodiment of the present invention, data may be transmitted and received at high speed by adjusting a communication channel (or a communication method) depending on an optical communication environment rather than being controlled by an environment. Thereamong, according to an embodiment of the present invention, the transmission device for transmitting data at high speed based on information on the optical communication environment and the reception device for receiving vehicle information based on the information on the optical communication environment will be described below.

In detail, the transmission device may transmit any one of a final transmission signal formed by synthesizing or combining an OCC OFDM signal generated based on OCC with a pulse wave signal or a final transmission signal formed by synthesizing or combining a signal generated based on LiFi with the pulse wave signal depending on an optical communication environment in order to transmit data at high speed. For example, in a situation in which a weather environment is poor, the final transmission signal generated by synthesizing or combining the OCC OFDM signal generated based on OCC with the pulse wave signal generated based on S2-PSK may be transmitted. In contrast, in a situation in which a weather environment is appropriate, the final transmission signal generated by synthesizing or combining the OFDM signal generated based on LiFi with the pulse wave signal generated based on S2-PSK may be transmitted. That is, a frequency of the transmitted final transmission signal may be changed depending on an environment. Thus, the final transmission signal may be generated by mixing high-speed data, and low-speed data may be generated in response to an environment state and may be transmitted while being less affected by weather.

In detail, the reception device may receive data using high-speed OCC technology or LiFi technology depending on an optical communication environment in order to receive high-speed data. For example, in a situation in which a weather environment is poor, high-speed data may be received through a camera installed in a vehicle and having a frame rate for receiving high-speed data, using high-speed OCC technology, and in a situation in which the weather environment is appropriate, high-speed data may be received using a photodetector such as a photodiode (PD) based on LiFi technology. Thus, high-speed data may be received rather than being limited by a weather environment, a lighting environment, or the like.

Figure 2:
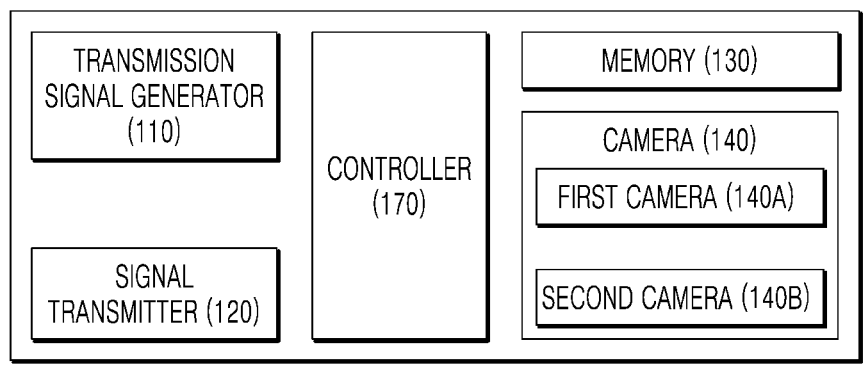
FIG. 2 is a schematic diagram showing the configuration of a communication device for adjusting a communication channel depending on an optical communication environment according to an embodiment of the present invention.
Figure 3:
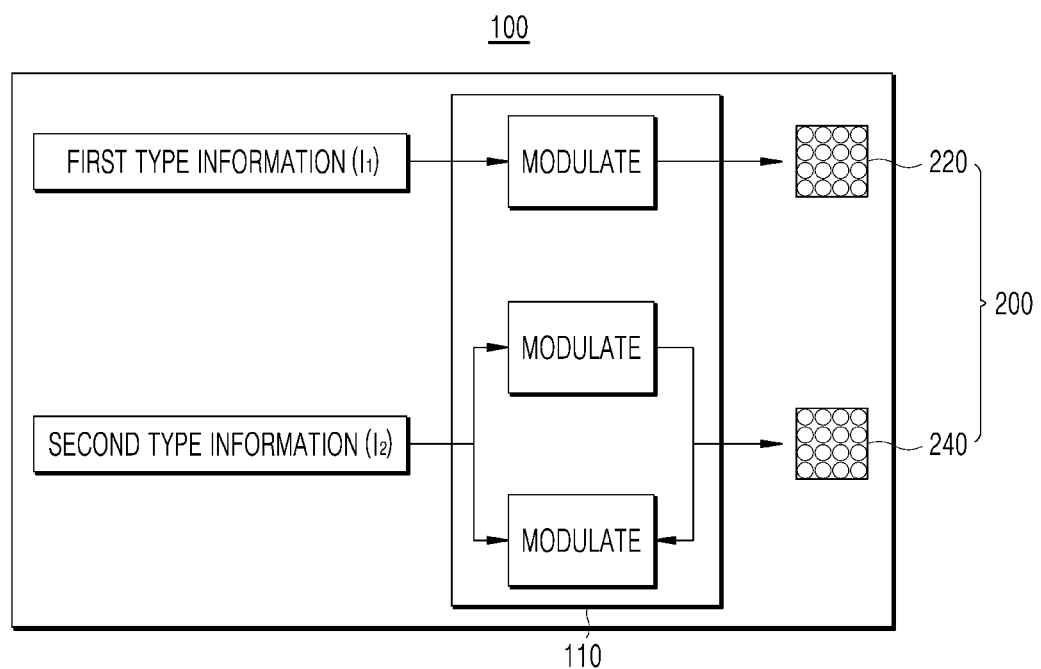
FIG. 3 is a diagram for explaining an example of optical communication transmission using a communication device according to an embodiment of the present invention.

FIG. 2 is a schematic diagram showing the configuration of a communication device for adjusting a communication channel (a communication manner) depending on an optical communication environment according to an embodiment of the present invention. FIG. 3 is a diagram for explaining an example of optical communication transmission using a communication device according to an embodiment of the present invention.

Referring to FIGS. 2 and 3, a communication device 100 may include a transmission signal generator 110, a signal transmitter 120, a memory 130, a camera 140, and a controller 170.

The camera 140 may be a device for capturing an external environment, and in detail, may include a first camera 140A and a second camera 140B. Here, the camera 140 may be a low frame rate camera for capturing the outside of the vehicle 10 and receiving information on a low frame rate generated by the counterpart vehicle 20 (and an external device). The second camera 140B may be a high frame rate camera for receiving information on a high frame rate generated by the counterpart vehicle 20. Hereinafter, the camera 140 will be described in terms of the first camera 140A for capturing the outside and receiving information on a low frame rate.

An external image captured by the camera 140 may be used as information for determining an optical communication environment. In detail, the camera 140 may capture weather information such as whether a region around the vehicle 10 is dark, whether it rains, or whether there is fog and a distance between the vehicle 10 and the counterpart vehicle 20. The optical communication environment may be determined by inferring an environment around the vehicle 10 in which optical communication is performed using the captured information. Here, as image information (which includes weather information such as the intensity of sunlight, the intensity of illumination, the amount of sunshine, rain, fog, and snow, and information on a distance to a communication counterpart) for determining the optical communication environment, an image captured by the first camera 140A may be mainly used, but in some embodiments, an image captured by the second camera 140B may be used alone or may also be used with an image captured by the first camera 140A.

When the optical communication environment is determined by inferring the environment around the vehicle 10, similar environment information to an actual optical communication environment may be inferred based on a captured image using an artificial intelligence (AI) algorithm and/or a machine learning algorithm based on included environment information and pre-input information.

The transmission signal generator 110 may be a device for generating a signal for transmitting information on the optical communication environment determined based on the image acquired from the camera 140 for capturing the outside to a light emitting diode (LED) 200 connected to the communication device for optical communication.

In detail, the transmission signal generator 110 may generate a first pulse signal and a second pulse signal by modulating first type information $I_1$ into a pulse wave signal based on S2-PSK. When modulating the first type information L, the transmission signal generator 110 may modulate low-speed data into a pulse wave signal based on an RoI detection algorithm. The generated first pulse signal and second pulse signal may correspond to a pulse wave having a frequency of 1 kHz and may simultaneously have a data transfer rate of 60 bps.

In the method of generating the first type information L as the pulse wave signal using the S2-PSK method, when there are pulse waves having the same phase in a first LED 220 and a second LED 240, a data bit may be interpreted as 1, and when there are pulse waves having opposite phases in the first LED 220 and the second LED 240, a data bit may be interpreted as 0.

As described above, the camera 140 may receive information on the counterpart vehicle 20 (e.g., driving lane information or a vehicle ID) other than information on the outside of the vehicle 10. The received information on the vehicle 20 may be referred to as the first type information L and the first type information L may have a size less than a first size.

The transmission signal generator 110 may modulate second type information $I_2$ into a first OFDM signal in a first frequency band or a second OFDM signal in a second frequency band.

As described above, the second camera 140B of the camera 140 may be a camera for receiving information on a high frame rate. The vehicle 10 may further include a photodetector (not shown) for receiving an optical signal. In this case, the photodetector may refer to a sensor for directly detecting light, such as a photodiode (PD), and an optical device for acquiring an image, such as a camera, may be excluded from the photodetector. The second camera 140B and the photodetector may be components for receiving high-speed data.

The second camera 140B and the photodetector may receive high-speed data, and the received high-speed data may be referred to as the second type information $I_2$. In this case, the second type information $I_2$ may be vehicle driving information such as an engine state, a brake state, or a steering angle of the vehicle 10, or may be a relatively large amount of information related to vehicle safety, such as accident information, traffic situation information, or road state information of a driving path.

In this case, the second type information $I_2$ received by the second camera 140B and the second type information $I_2$ received by the photodetector may have the same content but may have different resolutions. That is, when the second type information $I_2$ is received using the photodetector, OFDM LiFi is used, and thus, a data resolution may be higher than a resolution of the second type information $I_2$ received through the second camera 140B using the OFDM OCC method.

When the environment around the vehicle 10, captured by the camera 140, is not appropriate for an optical communication environment (e.g., rain or fog), the transmission signal generator 110 may modulate the second type information $I_2$ into a first OFDM signal in a first frequency band.

In detail, when the second camera 140B receives the second type information $I_2$, a transmission speed frequency may be first selected to modulate the received second type information $I_2$ into a first OFDM signal in a first frequency band. Then, the first OFDM signal may be encoded at a high-rate data transmission speed depending on the selected transmission speed frequency.

In this case, a reference frequency of the first OFDM signal may be 10 kHz to 100 kHz, and the first frequency band may be formed in a much higher frequency band than a frequency of a pulse wave using an S2-PSK method, but may be present in a lower frequency band than a second frequency band to be described below.

Such a method of performing optical communication by receiving information by the second camera 140B having a high frame rate and modulating a signal using an OFDM method may be referred to as high-speed OCC or OFDM OCC.

As such, when determining that the environment around the vehicle 10, captured by the camera 140, is not appropriate for the optical communication environment and it is not possible to perform optical communication in the optical communication environment, the controller 170 may control the transmission signal generator 110 to generate a signal by synthesizing or combining the first pulse signal and the second pulse signal with the first OFDM signal.

In contrast, when the environment around the vehicle 10, captured by the camera 140, is appropriate for the optical communication environment (e.g., sunny weather or lighting using sunlight is appropriate), the transmission signal generator 110 may modulate the second type information $I_2$ into a second OFDM signal in a second frequency band.

In detail, the transmission speed frequency may be selected to modulate the second type information $I_2$ received by the photodetector into the second OFDM signal in the second frequency band. Then, the second OFDM signal may be encoded at a high-rate data transmission speed depending on the selected transmission speed frequency.

Here, the second frequency band may have a frequency in a higher and wider band than signals used in an OFDM OCC method, and accordingly, a larger amount of data may be transmitted at high speed. In detail, the OFDM signal in the second frequency band may have a higher frequency band and a higher center frequency than the OFDM signal in the first frequency band.

Optical communication of modulating information received through a photodetector that is not a camera, such as a photodiode (PD), and transmitting data may be referred to as LiFi, and the use of an OFDM signal may be referred to as OFDM LiFi. In the case of OFDM LiFi, a reference frequency may be about 1 MHz to 1 GHz.

As such, the second type information may be modulated into the first OFDM signal in the first frequency band or the second OFDM signal in the second frequency band and then the final transmission signal may be generated.

In detail, when determining that it is possible to perform optical communication in the optical communication environment from an external environment image captured by the camera 140, the controller 170 may control the transmission signal generator 110 to generate the final transmission signal by synthesizing the first pulse signal and the second pulse signal with the second OFDM signal.

The generated final transmission signal may be transmitted to a light source of the vehicle 10 through the signal transmitter 120. The signal transmitter 120 may transmit the signal generated based on the first pulse signal to the first LED 220 among two LEDs 200 that are a light source and may transmit the signal generated based on the second pulse signal to the second LED 240.

In detail, the signal transmitter 120 may transmit a first clock signal having a first frequency, which is time-synchronized with the first pulse signal, to the first LED 220, and may transmit a second clock signal having a second frequency, which is time-synchronized with the second pulse signal, to the second LED 240.

In short, upon determining that an optical communication environment is not appropriate for optical communication using a photodetector based on the image received by the camera 140, the transmission signal generator 110 may synthesize or combine the first pulse signal and the second pulse signal with the first OFDM signal. In contrast, upon determining that the optical communication environment is appropriate for optical communication based on an image received by the camera 140, the transmission signal generator 110 may synthesize or combine the first pulse signal and the second pulse signal with the second OFDM signal.

As such, a final transmission signal obtained by synthesizing or combining the first pulse signal and the second pulse signal of the generated final transmission signal with the first OFDM signal may be transmitted using an OFDM OCC method. The signal transmission method that is the OFDM OCC method may be advantageous in that noise is low when data is received using an image sensor as a filter, but may have a lower speed than LiFi technology. In contrast, a final transmission signal obtained by synthesizing or combining the first pulse signal and the second pulse signal of the generated final transmission signal may be transmitted using LiFi. The signal transmission method that is LiFi may use a high-speed data communication system for achieving, for example, 1 Tbps, but may be advantageous to short-distance communication due to very high sensitivity (high interference) with respect to an environment such as rain and high interference.

The memory 130 may store a code for determining an optical communication environment based on an image acquired from the camera 140 for capturing the outside for optical communication, generating the first pulse signal and the second pulse signal by modulating the first type information $I_1$ into the pulse wave signal using an S2-PSK method, and modulating the second type information $I_2$ into any one of the first OFDM signal in the first frequency band or the second OFDM signal in the second frequency band depending on the determined optical communication environment.

The controller 170 for executing the memory 130 may be a component for determining the execution code stored in the memory 130 to be operated. To this end, the controller 170 may request, search for, receive, or use data for controlling the execution code stored in the memory 130, and may perform a predicted operation or an operation determined to be ideal among at least one executable operation.

Figure 4:
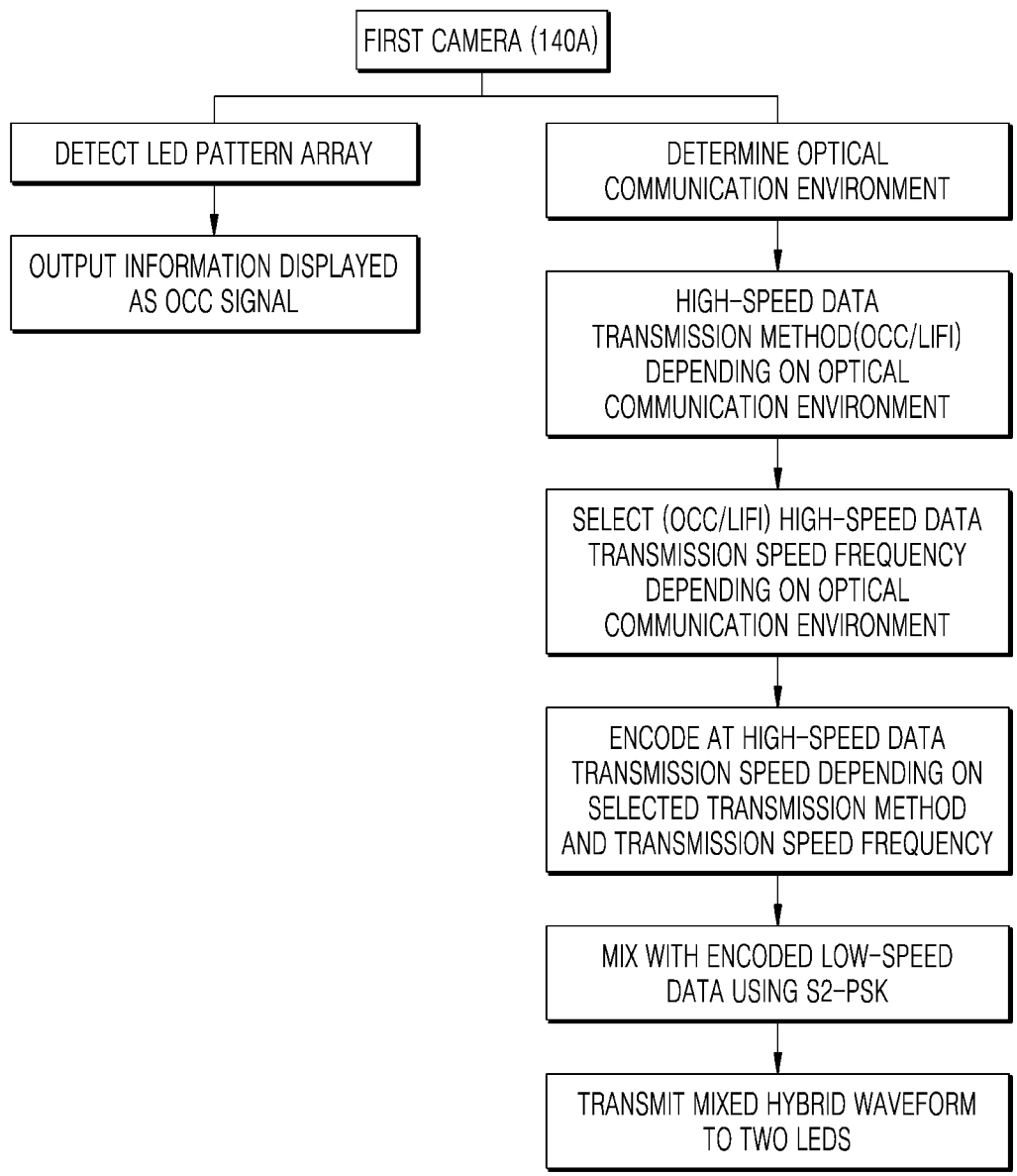
FIG. 4 is a diagram showing a procedure of processing data to adjust a communication channel based on an optical communication environment according to an embodiment of the present invention.
Figure 5:
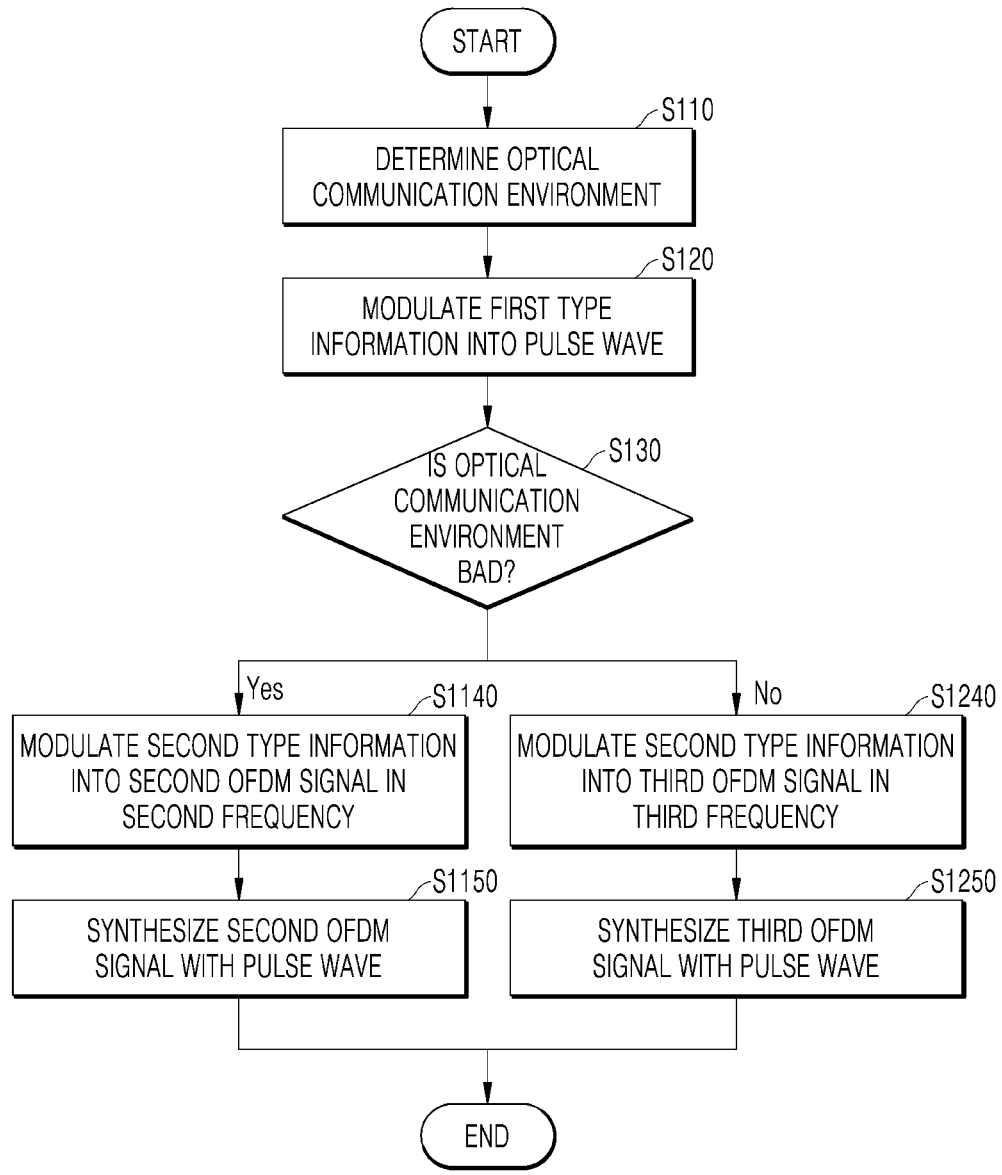
FIG. 5 is a flowchart showing a communication procedure of adjusting a communication channel based on an optical communication environment according to an embodiment of the present invention.
Figure 6:
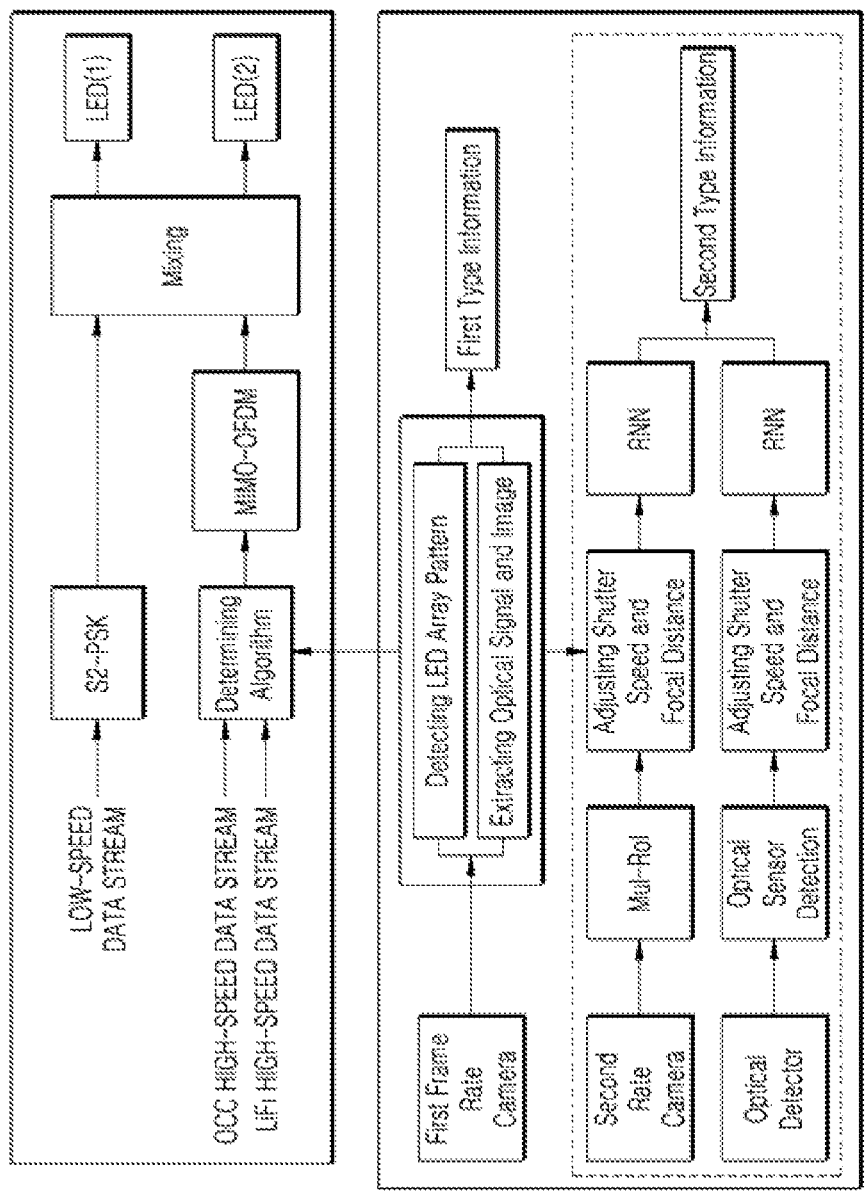
FIG. 6 is a diagram showing a system for embodying a communication channel based on an optical communication environment according to an embodiment of the present invention.
Figure 11:
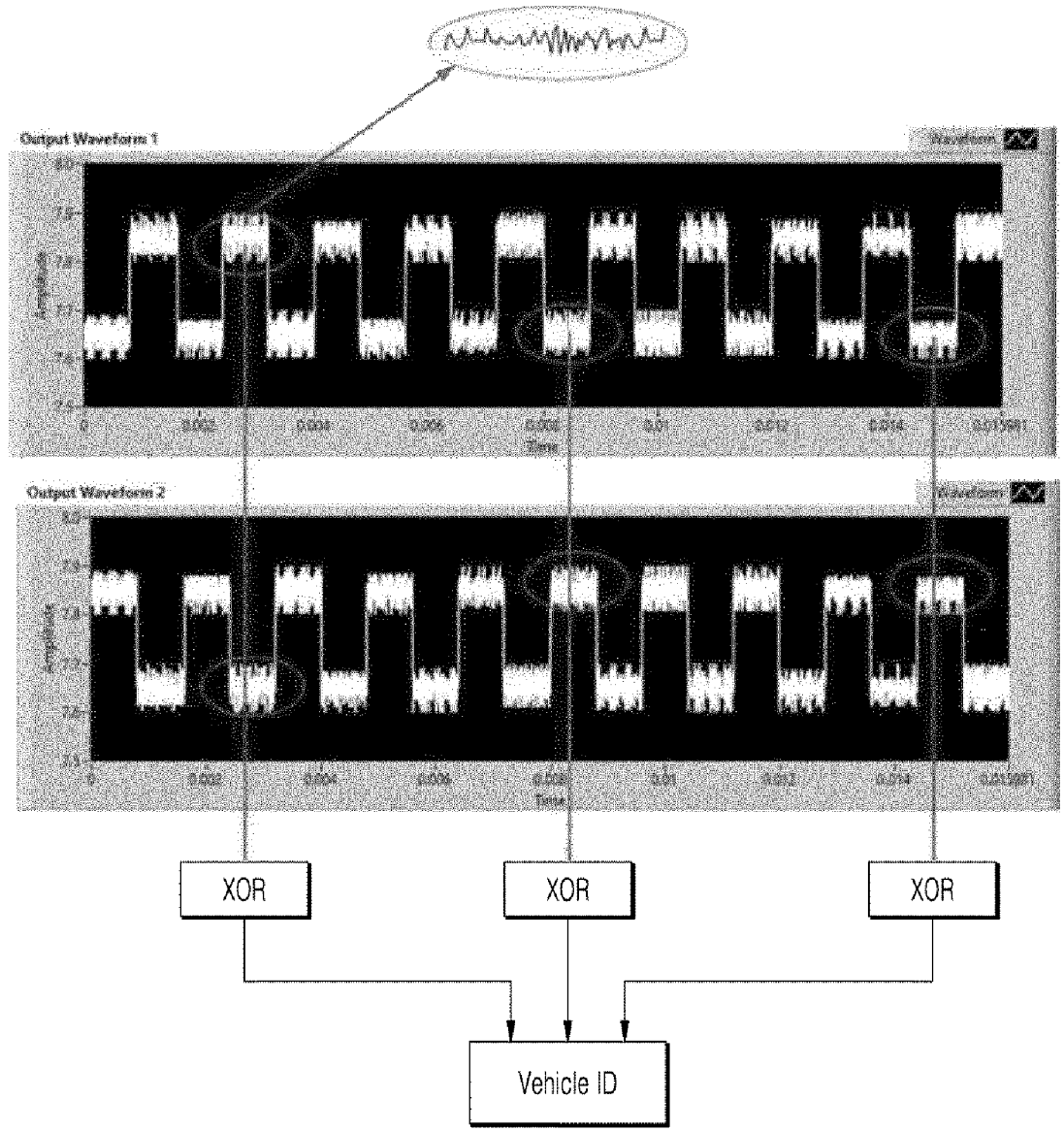
FIG. 11 is a diagram showing a hybrid waveform according to an embodiment of the present invention.

FIG. 4 is a diagram showing a procedure of processing data to adjust a communication channel (a communication manner) based on an optical communication environment according to an embodiment of the present invention. FIG. 5 is a flowchart showing a communication procedure of adjusting a communication channel based on an optical communication environment according to an embodiment of the present invention. FIG. 6 is a diagram showing a system for embodying a communication channel based on an optical communication environment according to an embodiment of the present invention. FIG. 11 is a diagram showing a hybrid waveform according to an embodiment of the present invention.

Referring to the drawings, the camera 140 of a first frame rate may receive an image captured by photographing a region around the vehicle 10. An optical communication environment may be determined based on the received image (operation S110).

Then, the first pulse signal and the second pulse signal may be generated by modulating the first type information $I_1$ into a pulse wave signal using an S2-PSK method (operation S120).

That is, the camera 140 may receive an optical signal and may simultaneously receive an image captured by photographing an environment outside the vehicle 10. The received image may include information on the optical communication environment. The information on the optical communication environment may be, for example, weather information, or lighting information (the intensity of sunlight). Environment information included in the image may be inferred as similar environment information to an actual optical communication environment through deep learning of FIG. 6 based on pre-input information.

Based on the inferred information on the optical communication environment, the second type information $I_2$ may be modulated into any one of the first OFDM signal in the first frequency band or the second OFDM signal in the second frequency band (operations S130, S1140, and S1240).

For example, in the state in which it is difficult to transmit an optical signal in the optical communication environment inferred through the image captured by the camera 140, that is, in the state in which it is not possible to perform optical communication through a photodiode in the optical communication environment, such as in the state in which it rains or it is cloudy, the second type information $I_2$ may be modulated into the first OFDM signal in the first frequency band (operation S1140). In this case, a method of modulating the second type information $I_2$ may be a baseband modulation method and may be a method of modulating the second type information $I_2$ into a MIMO-OFDM signal.

In detail, the MIMO-OFDM method may be a modulation method of encoding digital data in a multi-carrier frequency and may divide a bandwidth into orthogonal subcarriers in order to remove distortion through intersymbol inference (ISI) that is important technology for high-speed communication. A method of demodulating the second type information may use Fourier transform, and the first OFDM signal may overlap with the pulse wave signal without influencing the pulse wave signal.

A final transmission signal may be generated by synthesizing or combining the generated first OFDM signal with the first pulse signal and the second pulse signal that are generated as the first type information $I_1$ (operation S1150). As described above, the first OFDM signal may be generated using a MIMO-OFDM method, and thus may overlap with the pulse wave signal. Thus, the final transmission signal may be a signal obtained by synthesizing or combining the first pulse signal and the second pulse signal with the first OFDM signal.

In short, when the current state is determined as the state in which it is difficult to transmit an optical signal in the optical communication environment inferred through the image captured by the camera 140, a high-speed data transmission method may be selected. In this case, the current state is the state in which it is difficult to transfer an optical signal, and thus, high-speed data may be transmitted through high-speed OCC, which is a method of performing optical communication by modulating a signal thorough an OFDM method.

When the high-speed OCC method is selected as the high-speed data transmission method, a high-speed data transmission speed frequency corresponding thereto may be selected. The selected high-speed data transmission speed frequency may be formed in a much higher frequency band than a frequency of a pulse wave using an S2-PSK method as the first frequency band, but may be a frequency present in a lower frequency band than the second frequency band to be described below.

When the high-speed data transmission method and the high-speed data transmission speed frequency are selected, the first OFDM signal may be encoded at a high-rate data transmission speed depending on the selected transmission method and frequency.

A final transmission signal may be generated by mixing the encoded first OFDM signal with the S2-PSK signal, which is pre-modulated in a pulse wave. The generated final transmission signal may be transmitted to two LEDs 200 (refer to FIG. 3) that are a light source and are installed in the vehicle 10. Thus, in an environment condition in which it is difficult to transmit an optical signal, data may also be transmitted at high speed using OFDM OCC technology (a communication manner using a hybrid waveform obtained by synthesizing or combining a pulse wave modulated using an S2-PSK method with an OFDM signal in a frequency band detected by a high-speed camera).

In contrast, in the state in which it is possible to transfer an optical signal in the optical communication environment inferred through the image captured by the camera 140, that is, in the case of sunny weather in which an optical signal is easily transferred or in the state determined to be a state in which it is possible to perform optical communication using a photodiode (PD) due to an appropriate state of lighting (sunlight), the second type information $I_2$ may be modulated into the second OFDM signal in the second frequency band (operation S1240). In this case, a method of modulating the second type information $I_2$ may be a method of modulating the second type information $I_2$ into a LiFi OFDM signal.

In detail, the LiFi OFDM method may have a higher and wider band than signals used in the aforementioned OFDM OCC method, and accordingly, may be a communication of transferring a larger amount of data at high speed.

The final transmission signal may be generated by synthesizing or combining the generated second OFDM signal with the first pulse signal and the second pulse signal that are generated as the first type information $I_1$ (operation S1250). The generated final transmission signal may be generated by mixing the second OFDM signal using a LiFi OFDM method with the pulse wave signal, and accordingly, may be formed in a higher and wider frequency band than the mixed frequency of the aforementioned generated final transmission signal.

In short, when the current state is determined as the state in which it is possible to transfer an optical signal in the optical communication environment inferred through the image captured by the camera 140, high-speed data may be transmitted using LiFi as a high-speed data transmission method.

When LiFi is selected as the high-speed data transmission method, a high-speed data transmission speed frequency corresponding thereto may be selected. The selected high-speed data transmission speed frequency may be formed in the second frequency band, that is, may be formed in a much higher frequency band than a frequency of a pulse wave using an S2-PSK method and the aforementioned second frequency (refer to region A of FIG. 11).

When the high-speed data transmission method and the high-speed data transmission speed frequency are selected, the second OFDM signal may be encoded at a high-rate data transmission speed depending on the selected transmission method and frequency.

A final transmission signal may be generated by mixing the encoded second OFDM signal with the S2-PSK signal, which is pre-modulated in a pulse wave. The generated final transmission signal may be transmitted to the LEDs 200 (refer to FIG. 3) that are a light source and are installed in the vehicle 10. Thus, in a situation in which it is possible to transfer an optical signal, high-speed data may be transmitted using LiFi technology.

When the communication device and the communication method using the same according to the present invention are used, an optical communication environment state may be inferred from an image captured by a low frame rate camera among cameras installed in the vehicle. In addition, the first type information that is low-speed data including image information captured by the camera may be generated as a pulse wave signal based on S2-PSK.

Based on an optical communication environment inferred from image information for generating a pulse wave signal, when the inferred optical communication environment is poor, the second type information that is high-speed data may be modulated into the first OFDM signal in the first frequency band based on OCC. The modulated first OFDM signal may be synthesized or combined with the pulse wave signal, and the synthesized signal may be transmitted to an optical communication device of another device through an LED light source of the vehicle.

In contrast, when the inferred environment is poor, the second type information may be modulated into the second OFDM signal in the second frequency band based on LiFi. The modulated second OFDM signal may be synthesized or combined with the pulse wave signal, and the synthesized signal may be transmitted to an optical communication device of another device through the LED light source of the vehicle.

That is, the high-speed data transmission method may be selected based on the optical communication environment, and thus high-speed data may be modulated and transmitted with high reliability. In detail, in an environment condition in which it is difficult to transfer an optical signal, data may also be transmitted at high speed using OFDM OCC technology.

Figure 7:
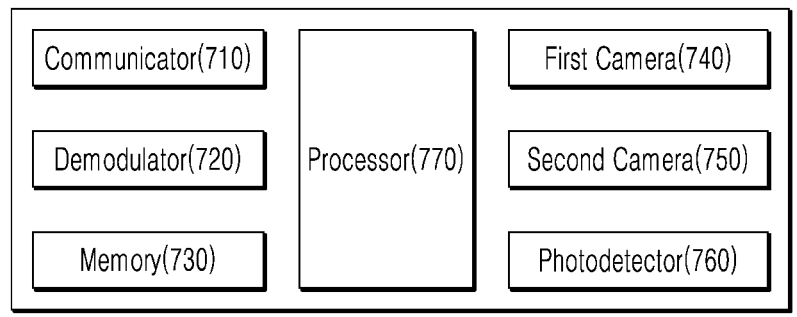
FIG. 7 is a schematic diagram showing the configuration of a communication control device for adjusting a communication channel depending on an optical communication environment according to another embodiment of the present invention.
Figure 8:
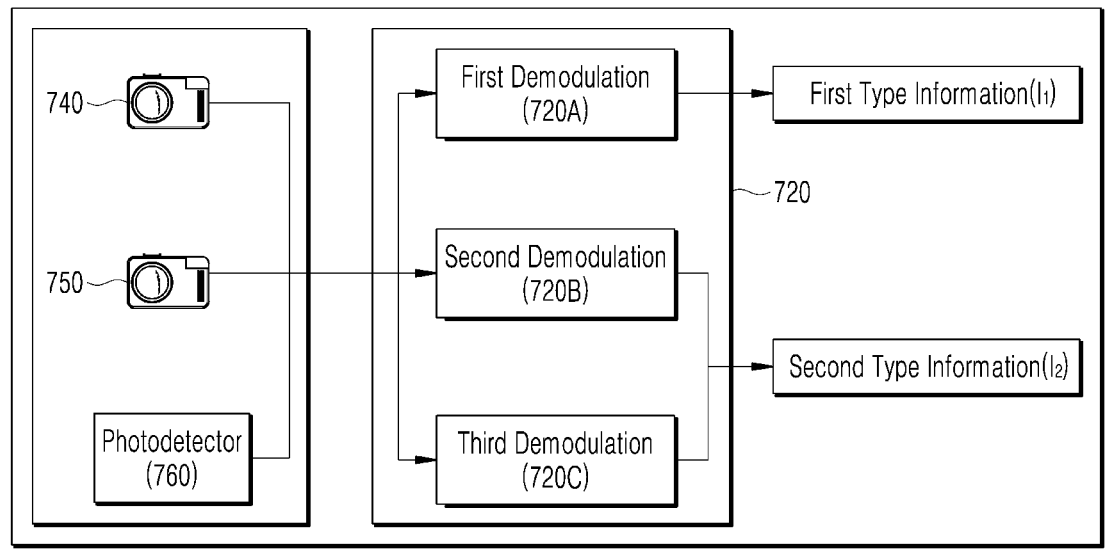
FIG. 8 is a diagram for explaining the configuration of a communication device for adjusting a communication channel depending on an optical communication environment according to another embodiment of the present invention.

FIG. 7 is a schematic diagram showing the configuration of a communication control device for adjusting a communication channel depending on an optical communication environment by a reception side of optical communication according to another embodiment of the present invention. FIG. 8 is a diagram for explaining the configuration of a communication device for adjusting a communication channel depending on an optical communication environment by a reception side of optical communication according to another embodiment of the present invention.

Referring to FIGS. 7 and 8, a communication control device 700 of a reception side may include a communicator 710, a demodulator 720, a memory 730, a first camera 740, a second camera 750, a photodetector 760, and a processor 770. Here, the photodetector 760 may refer to a sensor for directly detecting light, such as a photodiode (PD), and an optical device for acquiring an image, such as a camera, may be excluded from the photodetector 760.

The communicator 710 may be a component for communication between the vehicle 10 and the counterpart vehicle 20. The communicator 710 may receive data generated by the counterpart vehicle 20, and the received data may be used as information for activating any one device of the second camera or the photodetector 760 for receiving high-speed data, installed in the vehicle 10. The communicator 710 may be an internal communication network for receiving a signal generated in the vehicle 10, for example, weather information determined from an image acquired from the first camera 740 and activating any one device of the second camera 750 or the photodetector 760 through the processor 770.

The demodulator 720 may demodulate an optical signal including a first image received at a first frame rate of the first camera 740 using an S2-PSK method (720A). As the optical signal included in the first image is demodulated, the first type information L may be generated. Here, the first frame rate may have a lower value than the second frame rate, the first camera 740 may be a camera having a relatively low frame rate, the first frame rate may be, for example, 10 to 60 FPS, and the second frame rate may be, for example, 1,000 to 10,000 FPS. In this case, the signal modulated using the S2-PSK method may be a pulse wave having a frequency of 1 kHz and may, simultaneously, have a data transfer rate of 60 bps.

In this case, in the S2-PSK method of demodulating the optical signal received by the camera of the first frame rate, when there are pulse waves having the same phase in a first LED and a second LED, a data bit may be interpreted as 1, and when there are pulse waves having opposite phases in the first LED and the second LED, a data bit may be interpreted as 0.

As described above, the first type information L may be output as the optical signal received by the first camera of the demodulated first frame rate. In detail, the first type information $I_1$ may be data having a size less than a first size, acquired by the first camera 740 having a low frame rate, and may be generated based on the pulse wave signal by an LED. For example, the modulated first type information $I_1$ may be data having a small amount, such as an identification number of a vehicle or device for transmitting an optical signal or position information (e.g., driving lane information) of the device or the vehicle.

The optical communication environment may be predicted through the image received by the first camera of the first frame rate. In detail, the image captured by the first camera 740 may include information on an environment around the vehicle 10. For example, the image may include weather information, or lighting information (the intensity of sunlight), and similar environment information to an actual optical communication environment may be inferred using an artificial intelligence (AI) algorithm and/or a machine learning algorithm based on the included environment information and pre-input information.

When the current state is not appropriate for optical communication using an optical detector such as a photodiode (PD) based on the inferred environment information (e.g., cloudy, rainy, foggy or cloudy weather, or too much sunlight), the demodulator 720 may activate a second camera of a second frame rate (high speed) of the second camera 750 and may demodulate the optical signal from the image received from the second camera of the second frame rate using an OFDM signal demodulation method of a second frequency band (720B). For example, the second frame rate may be 1,000 to 10,000 FPS, and the reference frequency of the OFDM signal may be 10 kHz to 100 kHz. The first frequency band may be formed in a much higher frequency band than a frequency of a pulse wave using an S2-PSK method, but may be present in a lower frequency band than a second frequency band used by an OFDM signal in communication using a photodetector such as a photodiode (PD) to be described below. A method of modulating a signal through an OFDM method to be received by the second camera having a high frame rate and performing optical camera communication may be referred to as high-speed OCC or OFDM OCC.

In detail, the camera of the second frame rate may be a device for demodulating an OFDM signal, and to this end, the second camera 750 may include a camera having a high frame rate. Thus, high-speed data may be interpreted using a second demodulation method. The camera of the second frame rate may demodulate a signal obtained by modulating a MIMO-OFDM signal. The MIMO-OFDM signal may be a signal that is modulated using a modulating method of encoding digital data in a multi-carrier frequency and is also demodulated using a method of demodulating the OFDM signal when the signal is demodulated.

In contrast, when the state of the optical communication environment is poor based on the inferred environment information, for example, in the case of weather appropriate to use a photodetector such as a photodiode (PD) for sensing an optical signal, the processor 770 may activate the photodetector 760 and the photodetector 760 may demodulate the optical signal using an OFDM signal demodulation method of a second frequency band (720C). Here, the second frequency band may have a frequency in a higher and wider band than signals used in an OFDM OCC method, and accordingly, a larger amount of data may be transmitted at high speed. Optical communication performed using a photodetector that is not a camera, such as a photodiode (PD), may be referred to as LiFi, and the use of an OFDM signal may be referred to as OFDM LiFi. In the case of OFDM LiFi, a reference frequency may be about 1 MHz to 1 GHz.

In this case, the OFDM signal in the second frequency band, demodulated by the photodetector 760, may have a wider frequency band and a higher center frequency than the OFDM signal in the first frequency band, demodulated by the camera of the second frame rate.

For example, when the processor 770 determines that an optical communication environment is not appropriate for optical communication using a photodiode (PD) and uses OFDM OCC based on the image received by the first camera, if a pulse wave using an S2-PSK method includes 1 kHz and the OFDM OCC signal includes 80 kHz, data of 80 bits may be arranged as a signal using an OFDM method at each low signal or high signal of one unit of a pulse wave.

In another example, when the processor 770 determines that an optical communication environment is appropriate for optical communication using a photodiode (PD) and uses OFDM LiFi based on the image received by the first camera, if a pulse wave using an S2-PSK method includes 1 kHz and a reference frequency of the OFDM LiFi signal is 800 kHz, data of 800 bits may be arranged as a signal using an OFDM method at each low signal or high signal of one unit of a pulse wave. In another example, if a pulse wave using a S2-PSK method includes 2 kHz and a reference frequency of an OFDM LiFi signal is 800 kHz, data of 400 bits may be arranged as a signal using an OFDM method at each low signal or high signal of one unit of a pulse wave.

Thus, data having bits corresponding to a value obtained by dividing the reference frequency of the OFDM signal with a frequency of an S2-PSK pulse wave may be allocated to a low signal or a high signal of one unit of the signal modulated using the S2-PSK method.

Even if a component for demodulating a signal is changed depending on the optical communication environment, the second type information $I_2$ that is high-speed data may be extracted by the camera of the second frame rate and the photodetector 760. However, when a photodetector is used, that is, when OFDM LiFi is used, a resolution of data indicating the second type information is much higher than in the case in which a high frame rate camera is used, that is, in the case in which OFDM OCC is used.

For example, a signal indicated with high frequencies in the hybrid waveform shown in FIG. 11 may be an OFDM signal in the first frequency band or an OFDM signal in the second frequency band. As described above, the OFDM signal in the second frequency band may have a wider frequency band and a higher center frequency than the OFDM signal in the first frequency band.

The second type information $I_2$ acquired using such a method may be transmitted in the form of an OFDM signal, and the second type information $I_2$ may be vehicle driving information such as an engine state, a brake state, or a steering angle of the vehicle, or may be a relatively large amount of information related to vehicle safety, such as accident information, traffic situation information, or road state information of a driving path.

The memory 730 may store a code for determining an optical communication environment through an optical signal and image received using the first camera of the first frame rate and activating one of the second camera of the second frame rate and the photodetector 760 based on the determined optical communication environment.

The processor 770 may be a component for determining the execution code stored in the memory 730. To this end, the processor 770 may request, search for, receive, or use data for controlling the execution code stored in the memory 730, and may perform a predicted operation or an operation determined to be ideal among at least one executable operation.

Figure 9:
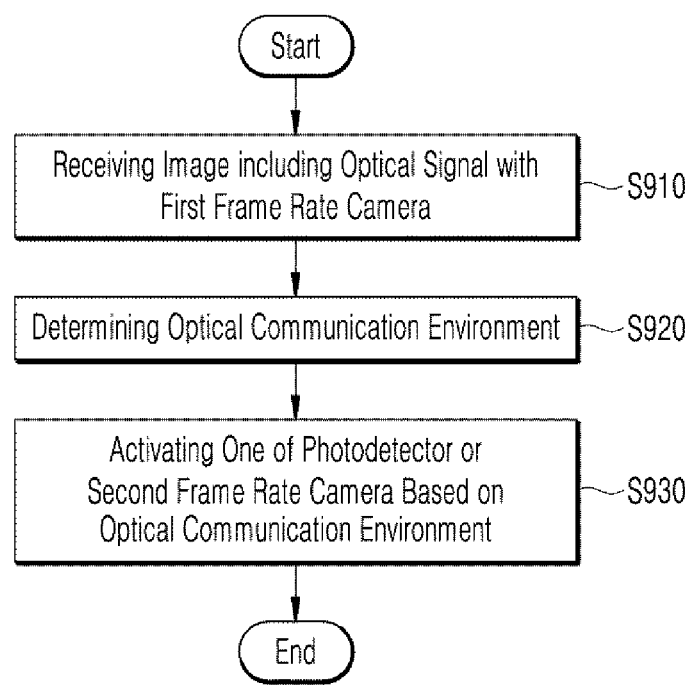
FIG. 9 is a flowchart showing a communication control procedure of adjusting a communication channel based on an optical communication environment according to an embodiment of the present invention.
Figure 10:
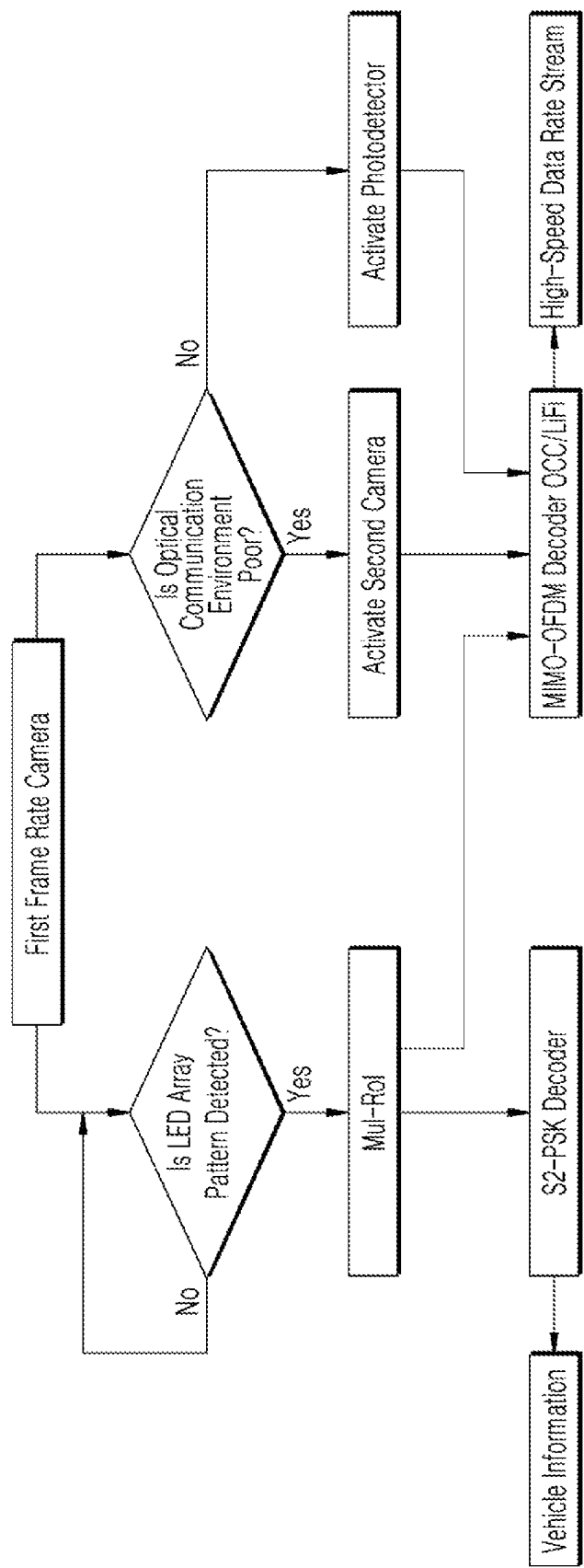
FIG. 10 is a diagram showing a procedure of processing data for adjusting a communication channel based on an optical communication environment according to an embodiment of the present invention.

FIG. 9 is a flowchart showing a communication control procedure of adjusting a communication channel (a communication manner) based on an optical communication environment according to an embodiment of the present invention. FIG. 10 is a diagram showing a procedure of processing data for adjusting a communication channel based on an optical communication environment according to an embodiment of the present invention. FIG. 11 is a diagram showing a hybrid waveform according to an embodiment of the present invention.

Referring to the drawings, the first camera 740 of the first frame rate may receive an image containing an optical signal (operation S910). The optical signal and image received by the first camera 740 may be data having a low frame rate.

The image received by the first camera 740 may include an optical communication environment. For example, the image may include weather information, or lighting information (the intensity of sunlight), and similar environment information to information on the vehicle 10 and an actual optical communication environment may be inferred through deep learning of FIG. 6 based on the included environment information and pre-input information (operation S920).

Any one of the second camera 750 of the second frame rate or the photodetector 760 may be activated based on the inferred information on the optical communication environment (operation S930).

For example, when the state of environment information is poor based on the inferred environment information, the second camera 750 of the second frame rate may be activated and may receive high-speed data using high-speed OFDM OCC technology.

In detail, a signal generated by an LED of the vehicle 10 may include high and low amplitudes in order to achieve a required dimming level. In addition, two waveforms for driving one pair of LEDs may include the same phase or opposite phases depending on a single bit input.

For example, when the optical communication environment inferred using the image received by the first camera 740 of the first frame rate is poor, the camera of the second frame rate may be activated and may acquire an image including an optical signal and may extract the second type information $I_2$ based on the optical signal in an image captured with a high frame rate. Here, the case in which the optical communication environment is poor may refer to the case in which it is difficult to perform an optical communication method (e.g., LiFi) through the photodetector 760 such as a photodiode due to rain or strong sunlight.

In this case, a method of demodulating the second type information $I_2$ may be a baseband demodulation method and may be a method of demodulating the second type information $I_2$ to a MIMO-OFDM signal.

When the second camera of the second frame rate is activated for more precise photography of a high-speed camera, an operation of changing a shutter speed and a focal length of the camera of the second frame rate based on the optical communication environment determined based on the image acquired from the first camera may be further performed. That is, an optimum shutter speed and focal length to capture an optical signal in a corresponding environment depending on an optical communication environment may be found and an operation condition of the camera may be changed.

In contrast, when the inferred optical communication environment is appropriate, the photodetector 760 may be activated and may receive high-speed data using LiFi technology.

As such, restrictions of an environment may be overcome and high-speed data may be received by activating any one of a camera or photodetector for receiving high-speed data depending on an optical communication environment.

In detail, LiFi technology may use a high-speed data communication system for achieving, for example, 1 Tbps, but may be advantageous to short distance communication due to very high sensitivity (high interference) with respect to an environment such as rain and high interference. In contrast, OCC technology may be advantageous to long-distance communication due to low interference with respect to an environment and may be advantageous in that noise is low when data is received using an image sensor as a filter, but may use a system having a lower speed than the LiFi technology.

Based thereon, when the optical communication environment is poor, even if there is interference from the environment, high-speed data may be received using OFDM OCC technology (a communication manner using a hybrid waveform formed by synthesizing or combining a pulse wave modulated using an S2-PSK method with an OFDM signal in a frequency band detected by a high-speed camera), and when the optical communication environment is good, influence of interference may be low, and thus high-speed data may be received at high speed using OFDM LiFi technology (a communication manner using a hybrid waveform obtained by synthesizing or combining a pulse wave modulated using an S2-PSK method with an OFDM signal in a higher frequency band detected by a photodiode).

An optical signal and an image including the optical signal may be received through a camera of the first frame rate among two cameras installed in a vehicle using the aforementioned method, and an optical communication environment state may be inferred through the received image.

When the inferred optical communication environment is appropriate, a photodetector may be activated and may receive high-speed data that is the second type information, and when the inferred optical communication environment is poor, the second type information may be received based on the image received by a camera of the second frame rate. It may be possible to perform such a reception method because a counterpart vehicle also includes the same system and also transmits a signal using OFDM LiFi when the optical communication environment is appropriate, and when the optical communication environment is poor, the counterpart vehicle transmits a signal using an OFDM OCC method.

When the photodetector is activated for reception of a more precise optical signal, an operation of changing a focal length and a signal sampling rate of the photodetector based on the optical communication environment determined based on the image acquired from the first camera may be further performed. That is, an optimum focal length and sampling rate to capture an optical signal in a corresponding environment depending on an optical communication environment may be found and an operation condition of the camera may be changed.

According to the method and the configuration, the second type information that is a large amount of data may be received with the first type information that is a small amount of data using a method appropriate for an optical communication environment.

According to an embodiment of the present invention, the state of an optical communication environment may be inferred from an image captured by a low frame rate camera among cameras installed in a vehicle. In addition, the first type information that is low-speed data including image information captured by the camera may be generated as a pulse wave signal based on S2-PSK.

Based on the optical communication environment inferred from the image information for generating the pulse wave signal, when the inferred optical communication environment is poor, the second type information that is high-speed data may be modulated into the first OFDM signal in the first frequency band based on OCC. The modulated first OFDM signal may be synthesized with the pulse wave signal, and the synthesized signal may be transmitted to an optical communication device of another device through an LED light source of the vehicle.

In contrast, when the inferred environment is poor, the second type information may be modulated into the second OFDM signal in the second frequency band based on LiFi. The modulated second OFDM signal may be synthesized with the pulse wave signal, and the synthesized signal may be transmitted to an optical communication device of another device through the LED light source of the vehicle.

That is, the high-speed data transmission method may be selected based on the optical communication environment, and thus high-speed data may be modulated and transmitted with high reliability.

According to an embodiment of the present invention, an image including an optical signal may be received through a camera of the first frame rate among two cameras installed in a vehicle, and the state of the optical communication environment may be inferred through the received image.

When the inferred optical communication environment is appropriate, the photodetector may be activated to receive high-speed data that is the second type information, and when the inferred optical communication environment is poor, the second type information may be received based on an image received by a camera of the second frame rate.

According to the method and the configuration, the second type information that is high-speed data may be received without being limited by an optical communication environment.

It will be appreciated by persons skilled in the art that the effects that could be achieved with the present invention are not limited to what has been particularly described hereinabove and other advantages of the present invention will be more clearly understood from the above detailed description.

The description of the embodiments of the present invention described above is for illustrative purposes only, and it will be appreciated by persons skilled in the art that the embodiments may be easily changed to other specific forms without departing from the technological spirit or essential features of the present invention. Therefore, it will be appreciated that the embodiments described above are illustrative and non-limiting in all respects. For example, an integrated type component may be implemented in a distributed manner, and similarly, distributed components may also be implemented in a combined form.

The scope of the present invention is defined by the claims to be described below rather than the detailed description, and all changes or modified forms derived from the meaning and scope of the claims and their equivalents should be construed as being included in the scope of the present invention.

What is claimed is:

1. A communication method of adjusting a communication channel depending on an optical communication environment, the method comprising:
   determining the optical communication environment based on an image acquired from a camera for capturing an outside for optical communication;
   generating a first pulse signal and a second pulse signal by modulating first type information into a pulse wave signal using a S2-PSK method; and
   modulating second type information into any one of a first OFDM signal in a first frequency band and a second OFDM signal in a second frequency band based on the optical communication environment, wherein
   the second frequency band is wider than the first frequency band;
   the second frequency band is higher than the first frequency band;
   when the optical communication environment is an environment in which it is impossible to perform optical communication through a photodiode, the modulating includes modulating the second type information into the first OFDM signal in the first frequency band; and
   the communication method further includes, after the modulating, generating a final transmission signal by synthesizing the first pulse signal and the second pulse signal with the first OFDM signal.

2. The method of claim 1, wherein:
   when the optical communication environment is an environment in which it is possible to perform optical communication through a photodiode, the modulating includes modulating the second type information into the second OFDM signal in the second frequency band; and
   the communication method further includes, after the modulating, generating a final transmission signal by synthesizing the first pulse signal and the second pulse signal with the second OFDM signal.

3. The method of claim 2, further comprising: after generating the final transmission signal, transmitting the final transmission signal through a first light source and a second light source connected to a communication device.

4. The method of claim 3, wherein:
   the communication device is installed in a vehicle;
   the first type information is data having a size less than a first size and includes an identification number of the vehicle or position information of the vehicle; and
   the second type information is data having a size equal to or greater than a second size and includes information related to driving of the vehicle or information related to safety of the vehicle.

5. The method of claim 4, wherein the optical communication environment includes a weather condition and a distance between the vehicle and another vehicle as an optical communication target.

6. The method of claim 1, further comprising: after generating the final transmission signal, transmitting the final transmission signal through a first light source and a second light source connected to a communication device.

7. The method of claim 6, wherein:
   the communication device is installed in a vehicle;
   the first type information is data having a size less than a first size and includes an identification number of the vehicle or position information of the vehicle; and
   the second type information is data having a size equal to or greater than a second size and includes information related to driving of the vehicle or information related to safety of the vehicle.

8. The method of claim 7, wherein the optical communication environment includes a weather condition and a distance between the vehicle and another vehicle as an optical communication target.

9. A communication device for adjusting a communication channel depending on an optical communication environment, the device comprising:
   a camera configured to capture an outside for optical communication;
   a transmission signal generator configured to generate a signal for transmission;
   a signal transmitter configured to transmit the generated signal through a light source connected to the communication device; and
   a controller configured to determine an optical communication environment based on an image acquired from the camera and to control the transmission signal generator and the signal transmitter, wherein:
   the transmission signal generator generates a first pulse signal and a second pulse signal by modulating first type information into a pulse wave signal using a S2-PSK method and modulates second type information into any one of a first OFDM signal in a first frequency band and a second OFDM signal in a second frequency band based on the optical communication environment, and wherein
   the second frequency band is wider than the first frequency band;
   the second frequency band is higher than the first frequency band; and
   when the optical communication environment is an environment in which it is impossible to perform optical communication through a photodiode, the controller modulates the second type information into the first OFDM signal in the first frequency band and performs control to generate a final transmission signal by synthesizing the first pulse signal and the second pulse signal with the first OFDM signal.

10. The device of claim 9, wherein:
    when the optical communication environment is an environment in which it is possible to perform optical communication through a photodiode, the controller controls the transmission signal generator to module the second type information to the second OFDM signal in the second frequency band and to generate a final transmission signal by synthesizing the first pulse signal and the second pulse signal with the second OFDM signal.

11. The device of claim 10, wherein:
the light source includes a first light source and a second light source; and
the signal transmitter transmits a signal generated based on the first pulse signal of the final transmission signal through the first light source and transmits a signal generated based on the second pulse signal through the second light source.

12. The device of claim 9, wherein:
the light source includes a first light source and a second light source; and
the signal transmitter transmits a signal generated based on the first pulse signal of the final transmission signal through the first light source and transmits a signal generated based on the second pulse signal through the second light source.

13. The device of claim 9, wherein:
the communication device is installed in a vehicle;
the first type information is data having a size less than a first size and include an identification number of the vehicle or position information of the vehicle; and
the second type information is data having a size equal to or greater than a second size and includes information related to driving of the vehicle or information related to safety of the vehicle.

14. The device of claim 13, wherein:
the camera is configured to capture an image of an external environment including an optical signal generated using an S2-PSK method from another vehicle; and
the controller is configured to extract first type information of the another vehicle based on the optical signal included in the image of the external environment acquired from the camera and to determine the optical communication environment based on the image of the external environment.

15. The device of claim 9, wherein the controller determines the first frequency band or the second frequency band depending on the optical communication environment.

16. A communication device for adjusting a communication channel depending on an optical communication environment, the device comprising:
at least one controller; and
a memory operatively connected to the controller and configured to store at least one code executed by the controller,
wherein the memory stores a code for causing the controller to determine the optical communication environment based on an image acquired from a camera for capturing an outside for optical communication, to generate a first pulse signal and a second pulse signal by modulating first type information into a pulse wave signal using an S2-PSK method, and to modulate second type information into any one of a first OFDM signal in a first frequency band or a second OFDM signal in a second frequency band based on the optical communication environment when the code is executed through the controller, and wherein
the second frequency band is wider than the first frequency band;
the second frequency band is higher than the first frequency band; and
when the optical communication environment is an environment in which it is impossible to perform optical communication through a photodiode, the memory stores a code for causing the controller to modulate the second type information into the first OFDM signal in the first frequency band and perform control to generate a final transmission signal by synthesizing the first pulse signal and the second pulse signal with the first OFDM signal.

* * * * *